United States Patent [19]

Kon

[11] Patent Number: 5,436,852
[45] Date of Patent: Jul. 25, 1995

[54] METHOD AND APPARATUS FOR CALCULATING PREDICTED MEAN THERMAL SENSITIVITY

[75] Inventor: Akihiko Kon, Kanagawa, Japan

[73] Assignee: Yamatake-Honeywell Co., Ltd., Tokyo, Japan

[21] Appl. No.: 310,930

[22] Filed: Sep. 22, 1994

Related U.S. Application Data

[63] Continuation of Ser. No. 976,480, Nov. 16, 1992, abandoned, which is a continuation-in-part of Ser. No. 762,584, Sep. 19, 1991, abandoned.

[30] Foreign Application Priority Data

Sep. 21, 1990 [JP] Japan ................................. 2-250008

[51] Int. Cl.⁶ ...................... G01K 13/00; G06F 15/00
[52] U.S. Cl. .................................. 364/557; 374/109; 236/91 C; 364/505
[58] Field of Search ................ 236/91 C, 91 D; 374/109

[56] References Cited

U.S. PATENT DOCUMENTS

| | | | |
|---|---|---|---|
| 3,751,634 | 8/1973 | Madsen | 219/494 |
| 5,058,388 | 10/1991 | Shaw et al. | 62/93 |
| 5,170,935 | 12/1992 | Federspiel et al. | 236/44 C |
| 5,333,953 | 7/1994 | Kon | 374/109 |

OTHER PUBLICATIONS

Ashrae Standard 55-1981, "Thermal Environmental Conditions for Human Occupancy", 1981, pp. 1-16.

*Primary Examiner*—Ellis B. Ramirez
*Assistant Examiner*—Eric W. Stamber
*Attorney, Agent, or Firm*—Blakely, Sokoloff, Taylor & Zafman

[57] ABSTRACT

According to a method and apparatus for calculating predicted mean thermal sensitivity which is used to control an air conditioning or heating unit, an operative temperature $T_0$ is calculated on the basis of a radiant temperature $Tr$, an air temperature $Ta$, an air velocity $Vair$, coefficients $b_1$ and $b_2$, and a coefficient $n$ according to the following equation:

$$T_0 = \frac{b_1 \cdot Tr + b_2 \cdot Vair^n \cdot Ta}{b_1 + b_2 \cdot Vair^n}$$

Predicted mean thermal sensitivity $PMV^*$ is calculated on the basis of the operative temperature $T_0$, the air temperature $Ta$, a relative humidity $RH$, a saturated water vapor pressure $Pa^*$, a clothing thermal resistance $Icl$, a variable $h_0$ ($h_0 = b_1 + b_2 \cdot Vair^n$), and coefficients $a_1$ to $a_6$ according to the following equation:

$$PMV^* = a_1 + a_2 \cdot Ta + a_3 \cdot RH \cdot Pa^* - \frac{a_4 \cdot h_0}{1 + a_5 \cdot Icl \cdot h_0} \cdot (a_6 - T_0)$$

8 Claims, 5 Drawing Sheets

METHOD AND APPARATUS FOR CALCULATING PREDICTED MEAN THERMAL SENSITIVITY

This is a continuation of application Ser. No. 07/976,480 filed Nov. 16, 1992 now abandoned, which is a continuation-in-part of application Ser. No. 07/762,584, filed Sep. 19, 1991 now abandoned.

BACKGROUND OF THE INVENTION

The present invention relates to a method and apparatus for calculating a PMV (Predicted Mean Vote) value corresponding to predicted mean thermal sensitivity representing the degree of comfort in an indoor environment or room. The present invention further relates to a method and apparatus for controlling the degree of comfort in an room through the use of an environment measuring unit that measures and supplies information about the environmental conditions present in the room to an environment control apparatus.

There have been tremendous improvements in the control of environmental conditions in the rooms or offices of a building. However, tenants are not satisfied with the mere cooling and heating provided by normal air-conditioning and heating units. The following needs have become increasingly apparent and are drawing a lot of attention:

- The desire to maintain thermal comfort in the office environment;
- The desire to keep office air clean;
- The desire to remove unpleasant odor and fill the office with good smell;
- The desire to decrease noise and maintain quietness; and
- The desire to keep the lighting appropriate In order to meet with the above needs successfully, more parameters than temperature and humidity must be measured for control purposes. In addition, their inter-relationships must be studied to provide a more accurate means for gauging and controlling the comfort index of a particular room or environment.

The concept of environmental comfort is catching on with the general public in many areas, and it is a current topic at various seminars and other gatherings. The interest in environmental comfort is increasing rapidly in industry as well as in higher education, however, no competitive product has yet been seen in the area of air-conditioning or heating.

In the development of the only known comfort sensor applicable to heating and air-conditioning, we began with the study of the definition of comfort for an indoor environment. Indoor comfort is related to many things such as the following:

Thermal Comfort
Indoor Air Quality
Odor & Perfume
Sound Noise
Lighting

Thermal comfort is related to the coldness and warmness human beings feel psychologically and physiologically. The following 6 parameters have been defined as those factors which cause the sensation of coldness and warmness felt by humans.

Air Temperature (Ta)
Radiant Temperature (Tr)
Air Velocity (Vair)
Humidity (RH)
Human Activity (Met)
Clothing (Icl)

There have been a few indices introduced as thermal comfort indices to evaluate these parameters, and the following two are particularly well known.
(Predicted Mean Vote)
SET* (New Standard Effective Temperature)

PMV is an index introduced by Professor Fanger of the Technical University of Denmark which indicates the sensations of cold and warmth felt by humans on a scale of $+3$ through $-3$ ($+3$ being very warm, 0-comfortable and $-3$—very cold). PMV is interrelated to the 6 parameters listed above and is an average value that represents how numerous people feel about cold and warmth, while individual differences are associated with the relationship between PMV and PPD (Predicted Percentage of Discomfort). This PVM index has been adopted by the International Standards Organization (ISO) as ISO 7730.

Prof. Fanger worked with over 1,300 people of both sexes, of various races and ages and from various parts of the world. The professor collected data from these individuals by having each undergo testing in an environmental laboratory with those 6 parameters varied. At the same time, he looked into the heat balance mechanism of the human body and ascertained that there were 7 ways for the body to lose heat energy after it had been generated from the foods the body took in: heat loss by motion; by water vaporization (through the skin to the environment, through the evaporation of sweat, through the water vapor in breath, through the temperature difference in breathing, through radiation); and by air flow.

As a result of such studies, Prof. Fanger formulated the following PMV equation and determined constants that were used in the equation from data collected through experiments involving the large number people. The Fanger PMV equation is designed for specific application to humans as shown below by association of the terms of the equation with their corresponding human energy parameters.

FANGER PMV Equation (ISO 7730)

| | |
|---|---|
| $PMV = (0.303 \times EXP(-0.036 \times M) + 0.028) \times$ | Proportional Parameter |
| $[(M - W)$ | Metabolism |
| $-3.05 \times 10^{-3} \times \{5733 - 6.99 \times (M - W) - pa\}$ | Water vaporization |
| $-0.42 \times \{(M - W) - 58.15\}$ | Sweat |
| $-1.7 \times 10^{-5} \times M \times (5867 - pa)$ | Water vapor through breathing |
| $-0.0014 \times M \times (34 - Ta)$ | Temperature difference in breathing |
| $-3.96 \times 10^{-8} \times fcl \times \{(Tcl + 273)^4 - (Tr + 273)^4\}$ | Radiation |
| $-fcl \times hc \times (tcl - Ta)]$ | Air flow | where $Tcl = 35.7 - 0.028 \times (M - W) - 0.155 \times Icl \times$

-continued
FANGER PMV Equation (ISO 7730)

$$[3.96 \times 10^{-8} \times fcl \times \{(Tcl + 273)^4 - (Tr + 273)^4\} +$$
$$fcl \times hc \times (Tcl - Ta)]$$

$$hc = \begin{cases} 2.38 \times (Tcl - Ta)^{0.25} & 2.38 \times (Tcl - Ta)^{0.25} > 12.1 \times \sqrt{Vair} \\ 12.1 \times \sqrt{Vair} & 12.1 \times \sqrt{Vair} \ 2.38 \times (Tcl - Ta)^{0.25} \end{cases}$$

$$fcl = \begin{cases} 1.00 + 0.2 \times Icl & Icl < 0.5 \\ 1.05 \times 0.1 \times Icl & Icl > 0.5 \end{cases}$$

and where
PMV=Predicted Mean Vote
M=Metabolism (W/m)
W=External Work, equal to zero from most metabolism
Icl=Thermal Resistance of clothing (clo)
fcl=The ratio of the surface of the closed body to the surface area of the nude body (N.D.)
Ta=Air temperature (°C.)
Tr=the mean radiant temperature (°C.)
Vair=Relative air velocity (m/s)

Despite the fact that the Fanger PMV equation has been adopted by ISO as ISO 7730, no one has been successful in developing a PMV sensor practically applicable to air-conditioning or heating. The Danish firm Bruel & Kjaer has developed, under the guidance of Prof. Fanger, a PMV measuring instrument for use in laboratory. However, because this instrument is designed specifically for laboratory use, the humidity, metabolism Met, and thermal resistance Icl of clothing are externally input; the sizes of the sensor and signal processing unit box are relatively large; and the instrument's range of operation with respect to the radiant temperature and air velocity is quite limited.

In addition, the Fanger PMV equation itself does not suggest or imply anything which might lead to the development of an accurate sensor directly applicable to heating or air conditioning. This is because the Fanger PMV equation is of a recursive construction with respect to clothing thermal resistance term Tcl such that any effort to design a sensor based upon the parameters of the conventional PMV equation would not be accurate. Since the radiant heat change equation R=3.96 fcl [(Td+273)$^4$−(Tr+273)$^4$] contains terms to the fourth power, the microcomputer used for calculating the PMV index is required to accurately calculate the value of R. In this respect, calculation of the PMV index is significantly prolonged because the microcomputer must repeatedly obtain values for the surface temperature of clothing due to the fact that the following parameter has to be repeatedly calculated.

Tcl−Tsk[3.06fcl{(Tcl+273)$^4$−(Tr+273)$^4$}+fcl hc (Tcl−Ta)]×0.155Tcl.

Furthermore, the conventional PMV equation is a collection of a large number of terms, and has a very complicated formation, e.g., biquadractic terms of Tcl and Tr and repetitive calculations of Tcl. Hence, complicated arithmetic processing is required so that the processing time is further prolonged. Moreover, the cost of a PMV calculating apparatus arranged on the basis of the conventional PMV equation is inevitably increased, thus posing some practical difficulties in the use of such a PMV calculating apparatus as a PMV comfort sensor for building air-conditioning or heating.

SUMMARY OF THE INVENTION

The present invention has been made to solve such problems, and has as one of its objects to provide a method and apparatus for calculating a PMV (Predicted Mean Vote) value corresponding to predicted mean thermal sensitivity representing the degree of comfort in an indoor environment which is specifically adapted for use in the air conditioning and heating of an office building.

Another objective of the present invention is to provide a method and apparatus for calculating a PMV (Predicted Mean Vote) value corresponding to predicted mean thermal sensitivity representing the degree of comfort in an indoor environment in which the terms of the underlying equations are linearized with respect to the parameters of the environment to be measured.

A further object of the present invention is to provide a method and apparatus for controlling the degree of comfort in a room through the use of an environment measuring unit that measures and supplies information about the environmental conditions present in the room to an environment control apparatus.

Yet another object of the present invention is to provide a compact, practical environmental comfort sensor for measurement of the degree of comfort in a room.

BRIEF DESCRIPTION OF THE DRAWINGS

FIGS. 4 (a) and 4(b) are views showing the overall arrangement of environment measuring unit;

DETAILED DESCRIPTION OF THE PRESENT INVENTION

1. Development Of the Underlying PMV and To Equations

The conventional Fanger PMV equation was studied in depth with particular attention to its 6th term relating to radiation, and the 7th term relating to air flow, and through linearization and other mathematical treatments of the equation, we derived an equation which we found would be the key to simplifying the recursive construction of the Fanger's equation. Listed below is the transformation of the equation in sequence.

If we name the 6th and 7th terms of the Fanger PMV equation as R and C, respectively, they are expressed as follows:

$$R = 3.96 \times 10^{-8} \times fcl \times [(Tcl+273)^4 - (Tr+273)^4] \quad (W/m^2)$$

$$C = fcl \times hc \times (Tcl - Ta) \quad (W/m^2)$$

The radiation related term R is linearized with regard to temperatures.

$$R = 3.9 \times fcl \times (Tcl - Tr) \quad (W/m^2)$$

and then R+C (radiation and convection related terms) is simplified as:

$$R + C = fcl \times ho \times (Tcl - To) \quad (W/m^2)$$

where $$To = \frac{3.9 \times Tr + hc \times Ta}{ho} \quad \text{Operative temperature (°C.)}$$

| | | |
|---|---|---|
| $ho = 3.9 + hc$ | | Total heat transfer coefficient (W/m² °k.) |
| 3.9 | | Radiant heat transfer coefficient (W/m² °k.) |
| $hc = A \times Vair^{0.5}$ | | Convection heat transfer coefficient (W/m °k.) |

(R+C) thus simplified is inserted in place where Tcl is expressed in the Fanger PMV equation, and then the Tcl equation is simplified as follows:

$$Tcl = To + \frac{Tsk - To}{1.0 + 0.155 \times fcl \times Icl \times ho} \quad (\text{°C.})$$

where

| | |
|---|---|
| $Tsk = 35.7 - 0.028 \times (Met - W) \times 58.15$ | Skin temperature (met) |
| Met | Metabolism (°C.) |
| W | External Work (met) |
| Icl | Thermal resistance of clothing (clo) |

Inducement of the above equation will be described in detail below. The part related to Tcl in the Fanger PMV equation is given as follows:

$$Tcl = 35.7 - 0.028 \times (M - W) - 0.155 \times Icl \times$$
$$[3.96 \times 10^{-8} \times fcl \times \{(Tcl + 273)^4 - (Tr + 273)^4\} +$$

-continued
$$fcl \times hc \times (Tcl - Ta)]$$

wherein M is the metabolism in W/m² and W' is the external work in W/m².

As described above, when $35.7 - 0.028 \times (Met - W) \times 58.15$ and $3.96 \times 10^{-8} \times fcl \times [(Tcl+273)^4 - (Tr+273)^4] + fcl \times hc \times (Tcl - Ta)$ are substituted with Tsk and $fcl \times ho \times (Tcl - To)$, respectively, the following equation is derived:

$$Tcl = Tsk - 0.155 \times fcl \times Icl \times ho \times (Tcl - To)$$

where

| | | |
|---|---|---|
| $ho = 3.9 + hc$ | | Total heat transfer coefficient (W/m² °k.) |
| 3.9 | | Radiant heat transfer coefficient (W/m² °k.) |
| $hc = A \times Vair^{0.5}$ | | Convection heat transfer coefficient (W/m² °k.) |

When Tcl values are transposed to the left-hand side, the following equation is derived:

$$Tcl + 0.155 \times fcl \times Icl \times ho \times Tcl = Tsk + 0.155 \times fcl \times Icl \times ho \times To$$

A term To−To as zero which does not pose any problem can be added to the right-hand side of the above equation, and only the right-hand side is transformed to derive the following equation:

$$Tcl + 0.155 \times fcl \times Icl \times ho \times Tcl = (1.0 + 0.155 \times fcl \times Icl \times ho) \times To + Tsk - To$$

The right- and left-hand sides of the above equation are divided by $1.0 + 0.155 \times fcl \times Icl \times ho)$ to obtain the following equation:

$$Tcl = To + \frac{Tsk - To}{1.0 + 0.155 \times fcl \times Icl \times ho}$$

The problem posed by the recursive construction associated with Tcl in the Fanger PMV equation can be solved, and the following equation can be derived:

$$Tcl = To + \frac{Tsk - To}{1.0 + 0.155 \times fcl \times Icl \times ho}$$

The term we want is the (R+C), i.e., the radiant and convection terms, that is:

$$R + C = fcl \times ho \times (Tcl - To) \quad (W/m^2)$$

Since the term (Tcl−To) has already been derived, the following equation is derived:

$$R + C = \frac{fcl - ho}{1.0 + 0.155 \times Icl \times fcl \times ho} \times (Tsk - To)$$

As described above, the 6th and 7th terms, i.e. the radiation and convection terms of the Fanger PMV equation, were extensively examined to perform mathematical operations such as linearization.

The simplified term (R+C) was then studied with an eye to developing the comfort sensor.

$$R + C = \frac{fcl - ho}{1.0 + 0.155 \times Icl \times fcl \times ho} \times (Tsk - To)$$

In order to measure R+C, a constant and metabolism Met are input as preset values in fcl and skin temperature Tsk, respectively.

The Icl value is also manually preset, while some sensors are used to measure the total heat transfer coefficient ho and the operative temperature To. In addition, an air temperature sensor and an air velocity sensor are provided to measure $ho = 3.9 + A \times Vair^{0.5}$.

Mean radiant temperature Tr as one of the factors of operative temperature To can be calculated by $Tr = Tg + 2.2 \times \sqrt{Vair} \times (Tg - Ta)$ as determined in ASHRAE STANDARD 55-1981. For this purpose, we need an air temperature sensor, an air velocity sensor, and a globe bulb thermometer. The output Tg from the globe bulb thermometer may be regarded as To in the low-air-velocity region of 0.15 to 0.25 m/s. The air velocity in the indoor atmosphere in the general air-conditioned building falls within the above range.

In this case, fcl is a constant, and skin temperature Tsk is calculated by presetting Met. The thermal resistance Icl is also preset, so that R+C can be measured by developing a single sensor, known as the operative temperature sensor, for measuring the operative temperature To.

In the Fanger PMV equation, if we change the value of activity (M) to be expressed in units of met instead of W/m² set the value of external work W at zero, change the value of the water vapor pressure to be expressed in relative humidity rather than absolute humidity, change the unit of pressure from pa to mmHg, replace the 2nd term, $5733 - 6.99 \times (M-W)$ with $1.92 \times Tsk - 2.53$, and replace the 6th and 7th terms with the Fanger equation, we obtain the following YHPMV (Yamatake Honeywell PMV) equation (A) as the fundamental equation used for development of our comfort sensor.

$$PMV = (0.303 \times EXP(-0.036 \times Met \times 58.15) + 0.028) \times \left[ 49.52 \times Met \times 58.15 + 10.28 + 0.0814 \times (Met \times Ta + (0.4067 + 0.1333 \times Met) \times 10^{-2} \times RH \times Pa^* - 0.781 \times Tsk - 0.42 \times (Met - 1) \times 58.15 - \frac{fcl \times ho}{1.0 + 0.155 \times fcl \times Icl \times ho} \times (Tsk - To) \right] \quad \text{Eq. A}$$

where
Tsk = 35.7 − 0.028 × Met × 58.15 (°C.)
Pa* = EXP(18.6686 − 4030.183/(Ta+235)) (mmHg)
ho = 3.9 + A × Vair$^{0.5}$
and where
PMV = Predicted Mean Vote
Met = Metabolism (met)
Icl = Thermal resistance of clothing (clo)
Ta = Air temperature (°C.)
Tr = Mean radiant temperature (°C.)
To = Operative Temperature (°C.)
ho Total heat transfer coefficient (W/m²k)
RH = Relative humidity (%)
Pa* = Saturated vapor pressure (mmHg)
Vair = Relative air velocity (m/s)

This YHPMV equation shows that a PMV value can be determined when operative temperature To, ambient air temperature Ta, humidity RH, and air velocity Vair are measured by sensors and values of thermal resistance Icl of clothing and metabolism Met are manually preset at appropriate levels. The equation provides a basis on which a practical PMV comfort sensor of YH can be developed.

There are sensors already available for measurement of air velocity Vair, ambient air temperature Ta, and humidity RH, so that what needs to be done is to develop a To sensor, and a YHPMV calculating apparatus having the preset values of thermal resistance of clothing Icl and metabolism Met input manually.

Operative temperature To is a combined temperature parameter of air temperature Ta, radiant temperature Tr, and air velocity Vair. Any object placed in the indoor environment is influenced by air temperature Ta, radiant temperature Tr, and air velocity Vair as is the human body.

Figure 8:
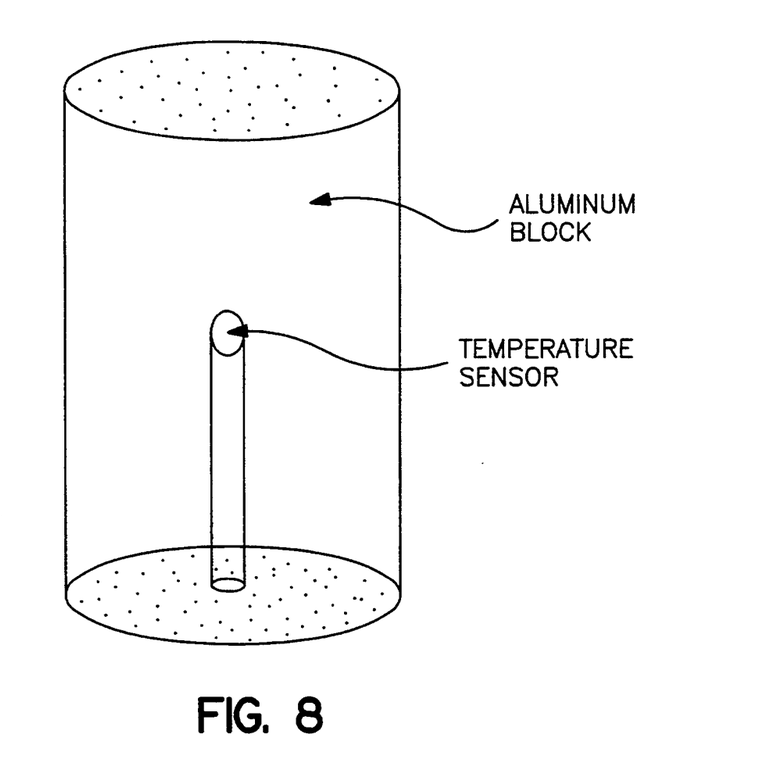
FIG. 8 is a schematic diagram of another embodiment of the PMV comfort or To sensor.

In one embodiment of the operative temperature sensor of the present invention, shown in FIG. 8, a small aluminum block 8 is used to simulate the human body. This To sensor is a small cylindrical aluminum metal block 8 (15 mm round and 40 mm long) having a painted surface in addition to a temperature sensor 9 incorporated inside the block 8.

The sensor surface is painted to sense radiation. Since variations in air temperature, radiation, and air velocity around the sensor are reflected on the sensor temperature, the sensor temperature is monitored to detect the state of the indoor thermal environment.

Since the To sensor senses the air temperature, radiation, and air velocity as in the human body, an output from the To sensor seemed to be proportional to To. However, according to the test result, it was found that this sensor had a lower sensitivity to radiation than that of the human body and had a higher sensitivity to the air velocity than that of the human body.

The above test result indicates that the low sensitivity represents a lower radiation energy received by the sensor than that received by the human body because the surface area of the sensor is smaller than that of the human body. Similarly, the high sensitivity to the air velocity represents that the sensor is much more influenced by the air velocity than the human body because the sensor has a smaller surface area than the human body. In any case, the result is a difference between the convection heat transfer coefficients of the sensor and that of a human body. To overcome this problem, we reexamined the definition of operative temperature To and the relation of the output value To* of the To sensor.

The definition formula (Eq.B) and the relation (Eq.C) are rewritten as follows:

$$To = \frac{3.9 \times Tr + hc \times Ta}{ho} \quad \text{Eq. B}$$
Operative temperature (°C.)

$$To^* = \frac{Hr(sens) \times Tr + A(sens) \times Vair^n \times Ta}{Ho(sens)} \quad \text{Eq. C}$$
Relation of output value To* (°C.)

where $ho = 3.9 + hc$     Total heat transfer coefficient

-continued

| | for human body (W/m °k.) |
|---|---|
| 3.9 | Radiant heat transfer coefficient for human body (W/m2 °k.) |
| $hc = A \times Vair^{0.5}$ | Convection heat transfer coefficient for human body (W/m² °k.) |
| $Ho(\text{sens}) = Hr(\text{sens}) + Hc(\text{sens})$ | Total heat transfer coefficient for sensor body (W/m² °k.) |
| $Hr(\text{sens})$ | Radiant heat transfer coefficient for 2 sensor body (W/m² °k.) |
| $Hc(\text{sens}) = A(\text{sens}) \times Vair^{0.5}$ | Convection heat transfer coefficient for sensor body (W/m² °k.) |

The radiant heat transfer coefficient for a human body, i.e., approximately 3.9, and the radiant heat transfer coefficient for sensor body Hr(sens) can be easily realized by properly selecting a paint coated on the surface of the sensor. However, the difference between the convection heat transfer coefficients for the human and sensor bodies, i.e., hc and Hc(sens), is left unchanged. We measured coefficients n and A(sens) of the compact To sensor in advance and incorporated the function of calculating operative temperature To in the PMV sensor by using measurement value To* of the To sensor, measurement value Vair of the air velocity sensor, and the coefficients n and A(sens), thereby solving the above problem.

The contents of our solution will be described below in detail.

Measurement value To* of the To sensor indicates the value on the right-hand side of equation Eq.C. The following calculation is made using measurement value Vair of the air velocity sensor and coefficients n, Hr(sens), and A(sens):

Ho (sens)=Hr (sens)+A(sens)×Vair$^n$ the resultant value is multiplied with measurement value To* that is Ho(sens)×To* is calculated. The resultant value indicates the solution of the following relation:

$$Hr(\text{sens}) \times Tr + Hc(\text{sens}) \times Ta$$

That is, equation Eq.D is established from Eq.C and Ho (sens):

$$Ho(\text{sens}) \times To^* = Hr(\text{sens}) \times Tr + Hc(\text{sens}) \times Ta \quad \text{Eq.D}$$

Using measurement value Ta of the air temperature sensor, measurement value Vair of the air velocity sensor, and coefficients n, A, and A(sens), the following relation is calculated:

$[A \times Vair^{0.5} - A(\text{sens}) \times Vair^n] \times Ta$ the resultant value is added to the value of Ho(sens)×To* thereby calculating the following relation:

$$Ho(\text{sens}) \times To^* + [A \times Vair^{0.5} - A(\text{sens}) \times Vair^n] \cdot \times Ta$$

The resultant value indicates the value of Hr(sens)×Tr +A(sens)×Vair$^n$×Ta. That is, equation Eq.E is established from Eq.D and $[A \times Vair^{0.5} - A(\text{sens}) \times Vair^n] \times Ta$ as follows:

$$Ho(\text{sens}) \times To^* + [A \times Vair^{0.5} - A(\text{sens}) \times Vair^n] \times Ta$$
$$= Hr(\text{sens}) \times Tr + A \times Vair^{0.5} \times Ta \quad \text{Eq.E}$$

Finally, $3.9 + A \times Vair^{0.5}$ is calculated using measurement value Ta of the air temperature sensor, measurement value Vair of the air velocity sensor, and coefficients 3.9 and A, and the value of is divided by $3.9 + A \times Vair^{0.5}$, that is $$\frac{Hr(\text{sens}) \times Tr + A \times Vair^{0.5} \times Ta}{(3.9 + A \times Vair^{0.5})}.$$

Eq.F is established from Eq.E and $3.9 + A \times Vair^{0.5}$:

$$\frac{Ho(\text{sens}) \times To^* + [A \times Vair^{0.5} - A(\text{Sens}) \times Vair^n] \times Ta}{(3.9 + A \times Vair^{0.5})} = \quad \text{Eq. F}$$

$$\frac{Hr(\text{sens}) \times Tr + A \times Vair^{0.5} \times Ta}{(3.9 + A \times Vair^{0.5})}.$$

Since the value of radiant heat transfer coefficient Hr(sens) for the compact sensor can be matched with 3.9 in order to manufacture a sensor, the right-hand side of Eq.F is given as follows:

$$\frac{3.9 \times Tr + A \times Vair^{0.5} \times Ta}{(3.9 + A \times Vair^{0.5})}.$$

This relation is the definition formula of operative temperature To itself that we want.

Operative temperature To and total heat transfer coefficient ho $(=3.9 + A \times Vair^{0.5})$ can be easily calculated using the compact To sensor, the air temperature sensor, the air velocity sensor, and coefficients n, A, and A(sens) obtained by experiment or the like. This calculation can be easily realized by analog and digital circuits, such as with a 16-bit microcomputer.

By incorporating the calculation function ranging from Eq.D to Eq.F in the PMV sensor, it became possible to obtain an accurate measurement of the operative temperature To and hence an accurate PMV* index value.

Figure 7:
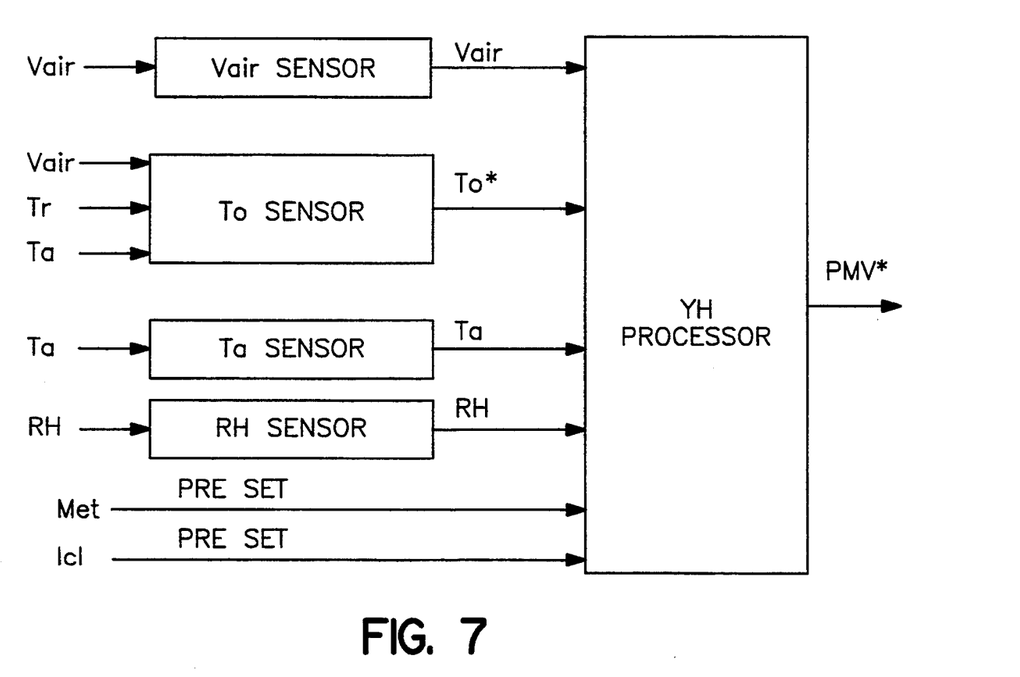
FIG. 7 is a block diagram of the PMV calculating apparatus which schematically shows the functional relationships between the preset and measured parameters used to obtain the PMV* index.

All of the foregoing is summarized by the block diagram of the PMV calculating apparatus shown in FIG. 7, where f1 represents a To sensor, in which the To equation holds true; f2 is a ho calculator, in which the ho equation holds true; f3 is a To calculator, in which Eq.D, Eq.E, and Eq.F hold true; and f4 is a YHPMV calculator, in which the YHPMV equation of equation A, now rewritten as the more general equation 1 shown below, holds true.

$$PMV = (0.303e^{-0.036M} + 0.028) \times [(M - W) - \quad (1)$$
$$3.05 \times 10^{-3} \cdot \{5733 - 6.99(M - W) - Pa\} -$$
$$0.42\{(M - W) - 58.15\} - 1.7 \times$$
$$10^{-5} \cdot M \cdot (5867 - Pa) - 0.0014 \cdot M \cdot$$
$$(34 - Ta) - 3.96 - 10^{-8} \cdot fcl \cdot \{Tcl + 273\}^4 -$$
$$(Tr + 273)^4\} - fcl \cdot hc \cdot (Tcl - Ta)]$$

where $$Tcl = Tsk - 0.155 \cdot Icl \cdot [3.96 \times 10^{-8} \cdot fcl - \{Tcl +$$
$$273)^4 - (Tr + 273)^4\} + fcl \cdot hc \cdot (Tcl - Ta)]$$

$$hc = \begin{bmatrix} 2.38 \, (Tcl - Ta)^{0.25} \\ \text{for } 2.38 \, (Tcl - Ta)^{0.25} > 12.1 \sqrt{Vair} \\ 12.1 \sqrt{Vair} \\ \text{for } 2.38 \, (Tcl - Ta)^{0.25} \leq 12.1 \, Vair \end{bmatrix}$$

and where
- TcQ = clothing surface temperature
- Tsk = skin temperature
- Pa = RH·Pa*
- RH = humidity
- Pa* = saturated water vapor pressure
- M = activity amount
- W' = work amount
- Ta = air temperature
- Tr = radiant temperature
- Icl = clothing thermal resistance
- Vair = air velocity
- fcl = factor In the operation of this embodiment of the PMV calculating apparatus, f1 as the To sensor measures temperature To* as a combined temperature of air temperature Ta, radiation Tr, and air velocity Vair, and f2 calculates total heat transfer coefficient ho using the measured values from the air temperature sensor and the air velocity sensor and coefficients 3.9 and A, and the calculation result is supplied to f3 and f4.

f3 calculates and outputs operative temperature To through the calculations of Eq.D, Eq.E, and Eq.F using output value To* from the To sensor, air temperature Ta, air velocity Vair, total heat transfer coefficient ho, and coefficients n, A, A (sens), and Hr (sens).

In f4, a PMV index is calculated by the YHPMV equation (Eq.1) using the output from the humidity sensor, input metabolism Met and thermal resistance Icl of clothing, and values ho and To respectively calculated by f2 and f3.

It should be noted that symbol PMV is a value given by the Fanger equation adaptively used in relation to human being, and that symbol PMV* is a value actually output from our devised apparatus and is suffixed with an asterisk to distinguish it from the Fanger symbol PMV.

2. Description Of The Embodiments Of The Present Invention

Figure 1A:
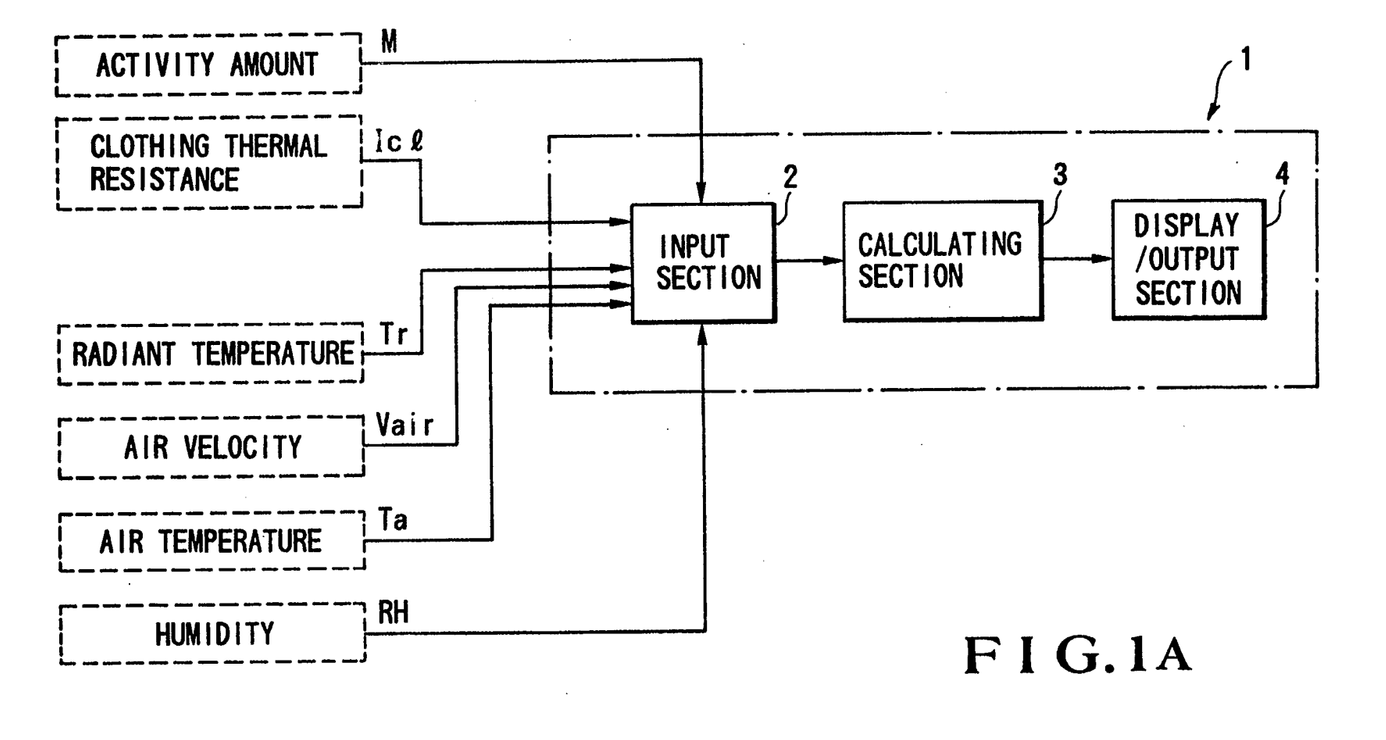
FIG. 1(a) is a block diagram showing a predicted mean thermal sensitivity calculating apparatus according to a first embodiment of the first aspect of the present invention.

FIG. 1(a) shows a first embodiment of the predicted mean thermal sensitivity calculating apparatus. A predicted mean thermal sensitivity calculating apparatus 1 comprises an input section 2, a calculating section 3, and a display/output section 4. An activity amount M and a clothing thermal resistance Icl are supplied, as set values, to the input section 2. In addition, a radiant temperature Tr, an air velocity Vair, an air temperature Ta, and a relative humidity RH are supplied, as detection values, to the input section 2. These set and detection values are supplied from the input section 2 to the calculating section 3. Subsequently, the calculating section 3 performs arithmetic processing as a characteristic feature of the present invention on the basis of a PMV* equation using an operative temperature To.

More specifically, the operative temperature To for a human body is calculated first by the following equation (2) on the basis of the radiant temperature Tr, the air temperature Ta, the air velocity Vair, coefficients $b_1$ and $b_2$, and a coefficient n. Predicted mean thermal sensitivity PMV* is calculated by the following equation (3) on the basis of the calculated operative temperature $T_0$, the air temperature Ta, a relative humidity RH, a saturated water vapor pressure Pa, the clothing thermal resistance Icl, a variable $h_0$ ($h_0 = b_1 + b_2 \cdot Vair^n$), and coefficients $a_1$ to $a_6$.

$$T_0 = \frac{b_1 \cdot Tr + b_2 \cdot Vair^n \cdot Ta}{b_1 + b_2 \cdot Vair^n} \quad (2)$$

$$PMV^* = \quad (3)$$
$$a_1 + a_2 \cdot Ta + a_3 \cdot RH \cdot Pa^* - \frac{a_4 \cdot h_0}{1 + a_5 \cdot Icl \cdot h_0} \cdot (a_6 - T_0)$$

The coefficients a1–a6 are defined eigenvalues based upon several characteristics of the environment and are not obtainable by measurement. These coefficients are defined as shown below:
- $a_1 = a \times [10.28 + 49.52 \times Met \times 58.15 - 0.781 \times Tsk - 0.42 \times (Met-1) \times 58.15]$
- $a_2 = a \times 0.0814 \times Met$
- $a_3 = a \times (0.4067 + 0.1333 \times Met) \times 10^{-2}$
- $a_4 = a \times fcl$
- $a_5 = 0.155 \times fcl$
- $a_6 = Tsk$ where
- $a = 0.303 \times EXP(-0.036 \times Met \times 58.15) + 0.028$
- $Tsk = 35.7 - 0.028 \times Met \times 58.15$ (°C.)

$$Pa^* = EXP\left(18.6686 - \frac{4030.183}{Ta + 235}\right) \text{(mmHg)}$$

| | |
|---|---|
| Met | Metabolism (met) |
| fcl | Coefficient (N.D.) |
| Ta | Air temperature (°C.) |
| Pa* | Saturated vapor pressure (mmHg) |

Coefficients b1 and b2 are also eigenvalues defined as follows:

$b_1 = 3.9$
$b_2 = A$
where

| | |
|---|---|
| 3.9 | Radiant heat transfer coefficient for human body (W/m² °k.) |
| $hc = A \times Vair^{0.5}$ | Convection heat transfer coefficient for human body (W/m² °k.) |

In addition, the coefficient n represents the index value of air velocity which takes on specific values indicating the indoor air flow states in a particular room as is apparent from its functional relationship with Vair. The coefficient n should take on values within the range of 0.36 and 0.6 so as to provide for the fact that the indoor air flow state varies depending upon the location. If n is to be made a constant, however, it is preferable that it take on the value of 0.5.

Equation (3) including equation (2) is obtained by trial and error so as to simplify the conventional PMV equation (equation (1)). The PMV* value obtained by this equation coincides with the PMV value obtained by the conventional PMV equation with considerably high accuracy. Table 1 shows the comparison between PMV and PMV* in the presence of air in a summertime under the following conditions: Icl=0.5, RH=50%, Ta=Tr=30° C., and Vair=0.2 m/s Table 2 shows the comparison between PMV and PMV* in the presence of air in a summertime under the following conditions: Icl=0.5, RH=50%, Ta=Tr=30° C., and Vair=0.4 m/s. It is apparent from these tables that PMV and PMV* coincide with each other with only a small error.

TABLE 1

| Data Associated With PMV | | Data Associated With PMV* | |
| --- | --- | --- | --- |
| PMV | 1.4977 | PMV* | 1.4767 |
| LOAD | 28.3663 | LOAD | 28.3992 |
| R + C | 22.0470 | R* + C* | 22.6971 |

TABLE 2

| Data Associated With PMV | | Data Associated With PMV* | |
| --- | --- | --- | --- |
| PMV | 1.3671 | PMV* | 1.2551 |
| LOAD | 25.8998 | LOAD* | 24.1467 |
| R + C | 24.5231 | R* + C* | 26.9492 |

Note that the PMV* value obtained by the calculating section 3 is supplied to the display/output section 4 to be displayed.

In the above tables, "LOAD" indicates a collective portion in equation (1) expressed as PMV $(0.303e^{-0.036M}+0.028) \times$ LOAD, and "LOAD*" corresponds to "LOAD" for PMV*. In addition, in $R+C=3.96-10^{-8} \cdot fcl-\{(Tcl+273)^4-(Tr+273)^4\}-fcl \cdot hc \cdot (Tcl-Ta)$, "R*+C*" corresponds to "R+C" for PMV*. "R*+C*" is proportional to $[a_4/(1+a_5 \cdot Icl)] \cdot (a_6-To)$.

As described above, according to the predicted mean thermal sensitivity calculating apparatus of this embodiment, the predicted mean thermal sensitivity PMV* can be calculated by four simple arithmetic operations without degrading the accuracy of the measured values, thereby greatly shortening the processing time as compared with the conventional apparatus. In addition, since only four simple arithmetic operations are required, the calculating section 3 can be constituted by simply incorporating an analog circuit mainly consisting of an operational amplifier or only one microcomputer. This promotes a reduction in cost of the apparatus and hence greatly contributes to a practical application of the apparatus as a PMV sensor for an environmental control apparatus, such as building air-conditioning or heating, although other environmental factors like humidity and air flow may also be controlled in a like manner.

Figure 1B:
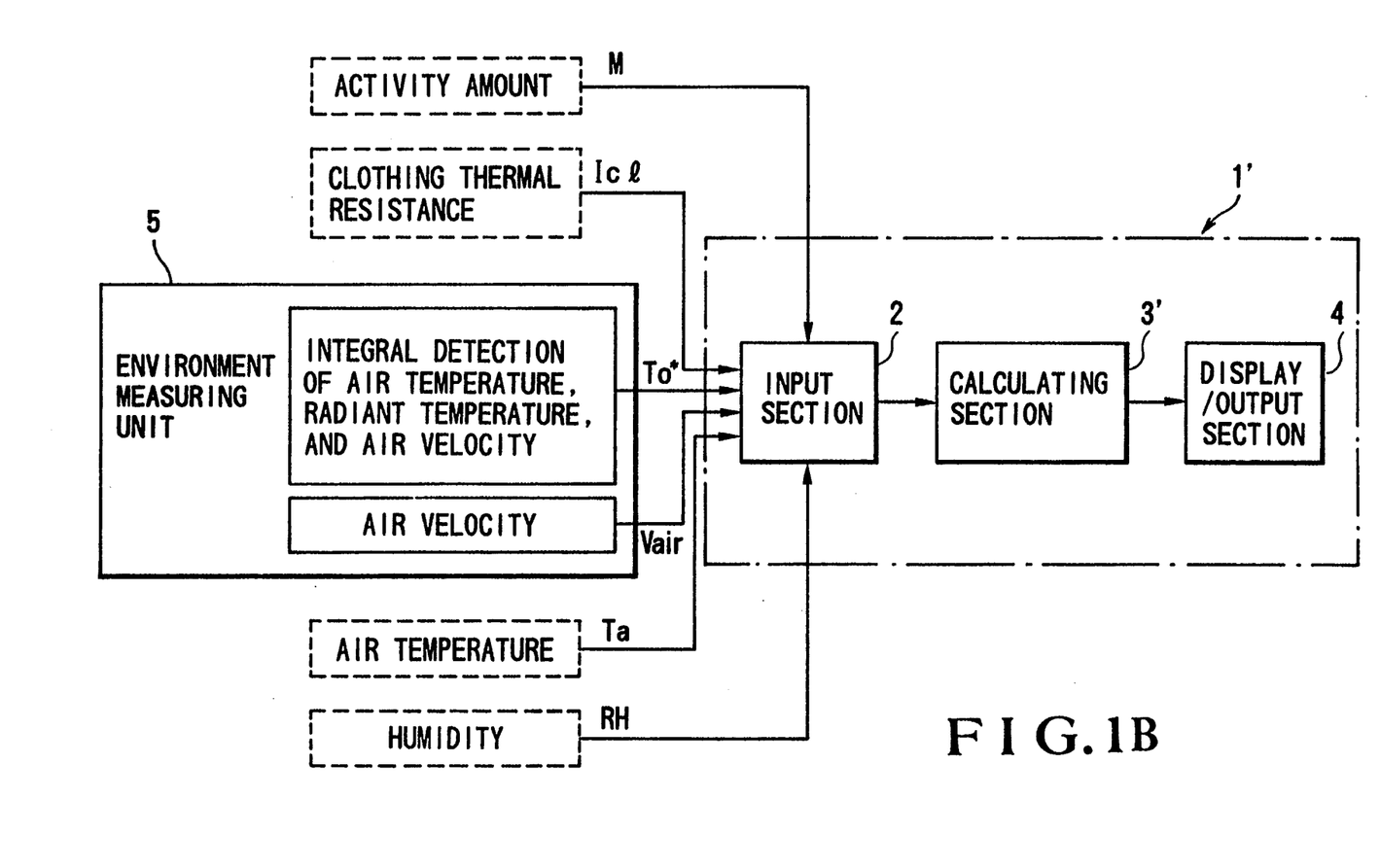
FIG. 1(b) is a block diagram showing a predicted mean thermal sensitivity calculating apparatus according to a second embodiment of the second aspect of the present invention.

FIG. 1(b) shows another embodiment of the present invention in which the environment measuring unit 5 is arranged in a room to obtain an operative temperature To* and an air velocity Vair, and these values are supplied to an input section 2 together with an activity amount M, a clothing thermal resistance Icl, an air temperature Ta, and a relative humidity RH.

Figure 2A:
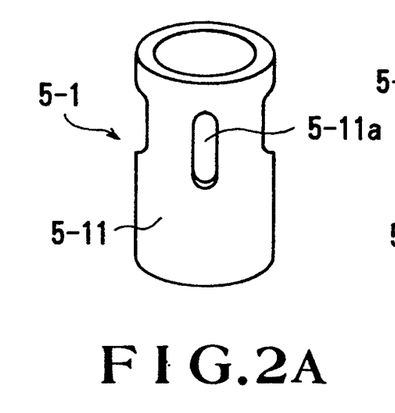
FIGS. 2(a) and 2(b) are views showing one embodiment of the PMV comfort or To sensor for an environment measuring unit used by the predicted mean thermal sensitivity calculating apparatus of the present invention.
Figure 2B:
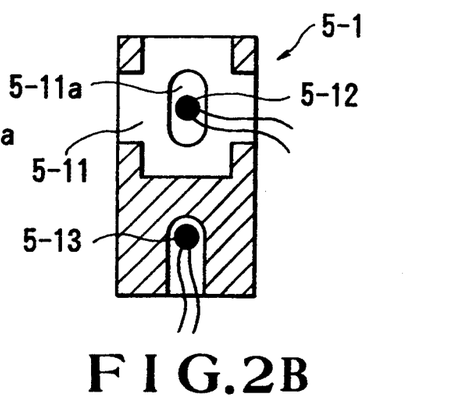

FIGS. 2(a) and 2(b) show one example of the environment measuring unit 5 in the form of a PMV comfort or To sensor. FIG. 2(a) is a perspective front view of a module 5-1 constituting the comfort sensor. FIG. 2(b) is a cross-sectional view of the sensor 5-1. The sensor 5-1 comprises a main body 5-11 constituted by a cylindrical metal member having a bottom, a thermal sensor 5-12 for measuring the air velocity Vair, and a thermal sensor 5-13 for measuring the operative temperature To*. The main body 5-11 has a plurality of elongated holes 5-11a through which air flows. The thermal sensor 5-12 is arranged in substantially the center of the internal space of the module main body 5-11, while the thermal sensor 5-13 is embedded in the bottom of the module main body 5-11. If this sensor 5-1 is disposed in a room, the operative temperature To* for the environment measuring unit 5 represented by the following equation (4) having a coefficient $b_3$ can be obtained through the thermal sensor 5-13.

$$T_0^* = \frac{b_1 \cdot Tr + b_3 \cdot Vair^n \cdot Ta}{b_1 + b_3 \cdot Vair^n} \quad (4)$$

Note that the coefficients $b_1$ and $b_3$ of the environment measuring unit 5 are determined in advance by experiments or the like. The value of the coefficient $b_3$ is defined by the functional relationship $b_3 = A(\text{sens})$, where $Hc(\text{sens}) = A(\text{sens}) \times (Vair^n)$   Convection heat transfer coefficient for sensor body (W/m² °k.)

In addition, the air velocity Vair can be obtained through the thermal sensor 5-12. In this embodiment, the air velocity Vair is obtained by an air velocity measuring circuit shown in FIG. 3. More specifically, the thermal sensor 5-12 is constituted by a first thermistor $T_1$ and a second thermistor $T_2$. The thermistor $T_1$ is heated to T °C., and an air temperature Ta is measured by the thermistor $T_2$ By controlling $\Delta T = T - Ta$ to be constant, i.e., using an air velocity measuring method based on a constant temperature difference, an output $V_{OUT}$ corresponding to the air velocity Vair is obtained. That is, if the energy consumption of the thermistor $T_1$ is represented by P(W), then, $$P(W) = K \cdot V_{OUT}^2 = (A + B \cdot Vair^n) \cdot \Delta T$$

Figure 3:
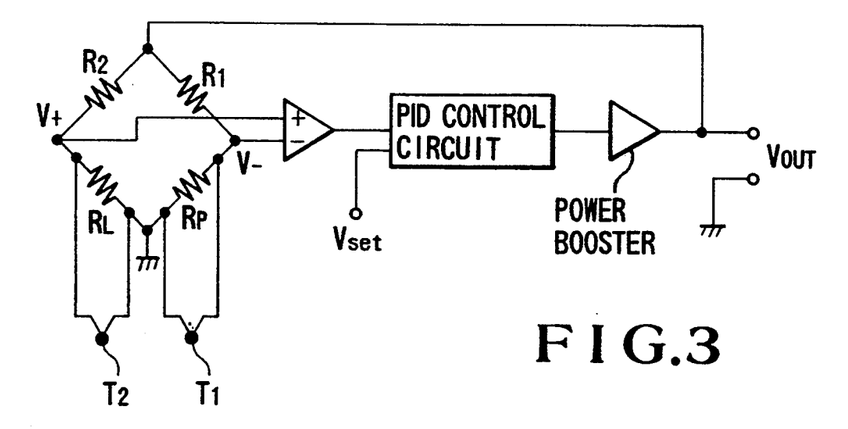
FIG. 3 is a circuit diagram showing an air velocity measuring circuit in the environment measuring unit.

Therefore, the output $V_{OUT}$ is given by $$V_{OUT} = f(Vair, \Delta T)$$
$$= \sqrt{(A + B \cdot Vair^n) \cdot \Delta T / K}$$

If this output $V_{OUT}$ is corrected to establish $$Vair^n = (V_{OUT}^2 \cdot K / \Delta T - A)/B$$

then, the air velocity Vair can be obtained.

As shown in FIG. 8, the PMV comfort sensor (also known as the To sensor) is a cylindrical aluminum metal block 8 (15 mm round×40 mm long) with its surface painted, and having a thermistor (PB5-43-S2 available from Shibaura Denshi) for measuring the block temperature incorporated therein. The air velocity sensor (not shown) is located on the metal block, and takes the form of a compact sensor.

The measurement values from the air temperature sensor (Pt 100 Ω), the To sensor, the air velocity sensor, and the humidity sensor (HY7201 available from YH) are input to a 10-bit A/D converter (μPD 7004C available from NEC), and digital data is input to a 16-bit microcomputer (V40 available from NEC).

The 16-bit microcomputer calculates prescribed total heat transfer coefficient ho from the air velocity data and the air temperature data. At the same time, operative temperature To is calculated by software in accordance with Eq.D, Eq.E, and Eq.F using output value To* and the air temperature from the temperature sensor in the To sensor, total heat transfer coefficient ho, and the like.

Finally, arithmetic software having the same contents as those of the YHPMV equation in the 16-bit microcomputer calculates a PMV value in accordance with the To value, the ho value, the air temperature, the humidity, and the metabolism, and the thermal resistance of clothing. The above arithmetic software programs are stored in a ROM serving as a storage element.

The PMV value is converted into an analog voltage of 0 to 100 mV through a 10-bit D/A converter ($\sim$PD610D available from NEC), and the analog voltage is externally output to an environmental control apparatus, which may comprise, but is not limited to, an air-conditioning unit or a heating unit, for controlling the degree of comfort in a room. At the same time, the PMV value can be displayed as a numeric value on a 7-segment LED.

If an air conditioning and/or heating unit is utilized as the environmental control apparatus, the analog voltage output from the D/A converter would be supplied to a controller of the unit which in turn controls at least the air temperature and air velocity of the supply air output to the room from the air conditioning and/or heating unit. This is accomplished by means of the controller electrically controlling at least a fan and a heating element of the unit which regulate the air velocity and air temperature in accordance with the magnitude of the analog voltage corresponding to the predicted mean thermal sensitivity PMV* value.

Figure 4A:
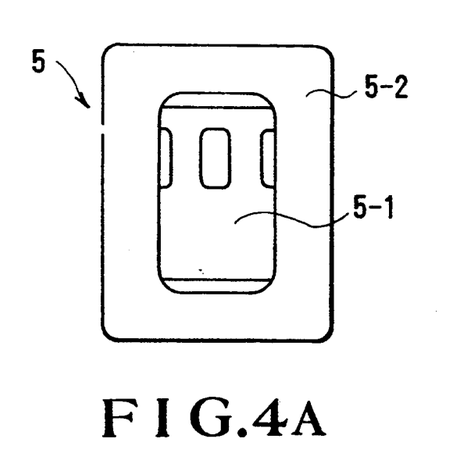
Figure 4B:
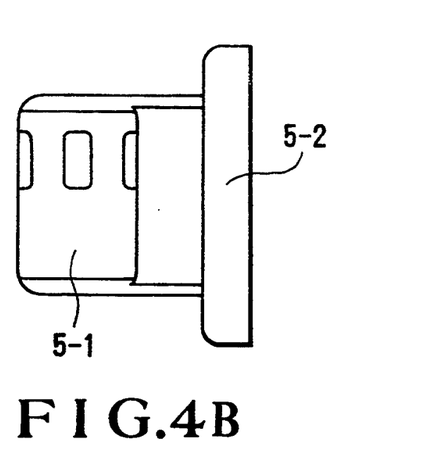

FIGS. 4(a) and 4(b) show the overall arrangement of the environment measuring unit 5 constituted by the sensor 5-1 shown in FIGS. 2(a) and 2(b). FIG. 4(a) is a front view of the unit 5. FIG. 4(b) is a side view of the unit 5. In this environment measuring unit 5, an electrical circuit for measuring the air velocity Vair and the operative temperature $T_0^*$ and outputting the measured values is arranged in a base 5-2 on which the sensor 5-1 is mounted.

In a predicted mean thermal sensitivity calculating apparatus 1', which receives the air velocity Vair, the operative temperature $T_0^*$ and the air temperature Ta measured by the environment measuring unit 5, an operative temperature $T_0$ is calculated by a calculating section 3' according to the following equations (5), (6), and (7):

$$T_0^* \times (b_1 \times b_3 \cdot Vair^n) = T_1 \quad (5)$$

$$T_1 + (b_2 - b_3) \cdot Vair^n \cdot Ta = T_2 \quad (6)$$

$$T_2/(b_1 + b_2 \cdot Vair^n) = T_0 \quad (7)$$

where $T_0^*$ is the operative temperature obtained by a sensor (environment measuring unit 5), and $T_0$ is the operative temperature with respect to a human being. Since a sensor is smaller than a human being, the coefficient b3 becomes larger than the coefficient b2 ($b_3 > b_2$). The operative temperature To with respect to a human being is obtained after the process of calculations by equations (5), (6), and (7), thus increasing the accuracy.

The predicted mean thermal sensitivity PMV is calculated by equation (3) on the basis of the operative temperature To obtained by this arithmetic processing, the air temperature Ta, the relative humidity RH, a saturated water vapor pressure Pa, the clothing thermal resistance Icl, a variable $h_0$ ($h_0 = b_1 + b_2 \cdot Vair^n$), and the coefficients $a_1$ to $a_6$.

Figures 5, 6A, 6B, 6C:
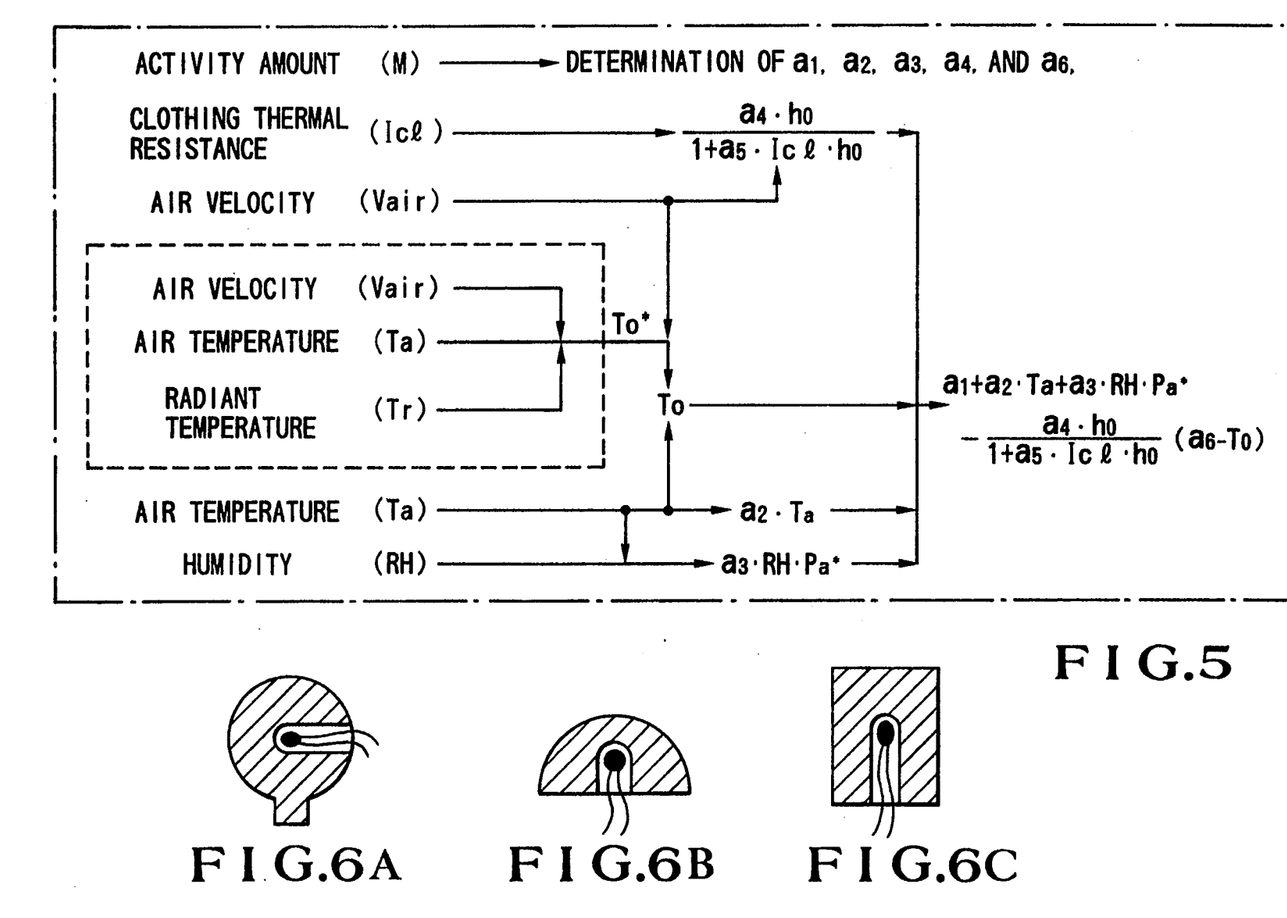
FIG. 5 is a view showing the process of calculating predicted mean thermal sensitivity PMV in the predicted mean thermal sensitivity calculating apparatus shown in FIG. 1(b) in which the surface of the PMV sensor's main body is colored to be sensitive to a radiant temperature Tr so that the emissivity is increased.
FIGS. 6(a) to 6(c) are cross-sectional views respectively showing modifications of the PMV sensor's main body used for the environment measuring unit.

FIG. 5 shows the process of calculating the predicted mean thermal sensitivity PMV in the predicted mean thermal sensitivity calculating apparatus 1'.

According to this embodiment, since the operative temperature $T_0^*$ close to the operative temperature $T_0$ is obtained by the environment measuring unit 5, arithmetic processing for the operative temperature To is simplified, and the hardware arrangement of the calculating section 3' is simplified. In addition, the processing time is shortened, resulting in a further reduction in cost.

In the above-described embodiment, the main body 5-11 is constituted by a cylindrical member having a bottom. However, as shown in FIGS. 6(a), 6(b), and 6(c), the main body may be constituted by a spherical member, a hemispherical member, or a columnar member. In addition, the place where the thermal sensor 5-12 for measuring the air velocity Vair is arranged is not limited to the internal space of the module main body. For example, the sensor may be arranged on the outer surface of the module main body or near the outside of the module main body.

As is apparent from the above description, according to the predicted mean thermal sensitivity calculating apparatus of the present invention, the predicted mean thermal sensitivity PMV can be calculated by four simple arithmetic operations without degrading the accuracy, and the processing time can be greatly shortened as compared with the conventional apparatus. In addition, since only simple arithmetic processing is required, the calculating section 3 can be constituted by simply incorporating an analog circuit mainly consisting of an operational amplifier or only one microcomputer. This promotes a reduction in cost of the apparatus, and hence, greatly contributes to a practical application of the apparatus as a PMV sensor for building air-conditioning.

Similarly, since the operative temperature $T_0^*$ close to the operative temperature $T_0$ is obtained by the environment measuring unit, arithmetic processing for the operative temperature $T_0$ is simplified, and the hardware arrangement of the calculating section is simplified. In addition, the processing time is shortened, resulting in a further reduction in cost.

What is claimed is:

1. A method of controlling an air conditioning and/or heating unit for regulating the degree of comfort in an environment in accordance with a predicted mean thermal sensitivity PMV* value, comprising the steps of:

measuring a radiant temperature Tr, an air temperature Ta, an air velocity Vair, a relative humidity RH and a saturated water vapor pressure Pa*;

calculating an operative temperature $T_0$ on the basis of the radiant temperature Tr, the air temperature Ta, the air velocity Vair, eigenvalue coefficients $b_1$ and $b_2$, and a coefficient n representing an index value of the air velocity Vair, according to the following equation:

$$T_0 = \frac{b_1 \cdot Tr + b_2 \cdot Vair^n \cdot Ta}{b_1 + b_2 \cdot Vair^n}$$

where
- $b_1 = 3.9$ (the radiant heat transfer coefficient for a human body (W/m² °K.)),
- $b_2 = A$ (where $hc = A \times Vair^{0.5}$ is the convection heat transfer coefficient for human body (W/m² °K.)), and
- the coefficient n ranges in value from 0.36 to 0.6;

calculating the predicted mean thermal sensitivity PMV* value on the basis of the operative temperature $T_0$, the air temperature Ta, the relative humidity RH, the saturated water vapor pressure Pa*, a clothing thermal resistance Icl, a variable $h_0$ ($h_0 = b_1 + b_2 \cdot Vair^n$), and eigenvalue coefficients $a_1$ to $a_6$ according to the following equation:

$$PMV^* = a_1 + a_2 \cdot Ta + a_3 \cdot RH \cdot Pa^* - \frac{a_4 \cdot h_0}{1 + a_5 \cdot Icl \cdot h_0} \cdot (a_6 - T_0)$$

where
- $a_1 = a \times [10.28 + 49.52 \times Met \times 58.15 - 0.781 \times Tsk - 0.42 \times (Met-1) \times 58.15]$
- $a_2 = a \times 0.0814 \times Met$
- $a_3 = a \times (0.4067 + 0.1333 \times Met) \times 10^{-2}$
- $a_4 = a \times fcl$
- $a_5 = 0.155 \times fcl$
- $a_6 = Tsk$
- $a = 0.303 \times EXP(-0.036 \times Met \times 58.15) + 0.028$
- $Tsk = 35.7 - 0.028 \times Met \times 58.15$ (°C.)

$$Pa^* = EXP\left(18.6686 - \frac{4030.183}{Ta + 235}\right) (mmHg)$$

Met = Metabolism (met)
fcl = Coefficient (N.D.)
Ta = Air temperature (°C.)
Pa* = Saturated vapor pressure (mmHg);

generating an electrical control signal having a magnitude corresponding to the calculated predicted mean thermal sensitivity PMV* value;

supplying the electrical control signal to the air conditioning and/or heating unit; and controlling at least the air temperature and air velocity of supply air output to the environment from the air conditioning and/or heating unit in accordance with the magnitude of the electrical control signal to regulate the degree of comfort in the environment.

2. A method according to claim 1, further comprising the step of obtaining a measured operative temperature $T_0^*$ through the use of an environment measuring unit, the measured operative temperature $T_0^*$ having an eigenvalue coefficient $b_3$ and being represented by the following equation:

$$T_0^* = \frac{b_1 \cdot Tr + b_3 \cdot Vair^n \cdot Ta}{b_1 + b_3 \cdot Vair^n}$$

wherein the operative temperature $T_0$ is then calculated by the following three equations:

$$T_1 = T_0^* \times (b_1 \times b_3 \cdot Vair^n)$$

$$T_2 = T_1 + (b_2 - b_3) \cdot Vair^n \cdot Ta$$

$$T_0 = T_2 / (b_1 + b_2 \cdot Vair^n)$$

and wherein
- $b_3 = A(sens)$ (where $Hc(sens) = A(sens) \times (Vair^n)$ is the convection heat transfer coefficient for a sensor body (W/m² °K.)).

3. An apparatus for providing adaptable control of an air conditioning and/or heating unit to regulate the degree of comfort in an environment in accordance with a predicted mean thermal sensitivity PMV* value, the apparatus comprising:

at least one environment measuring sensor for measuring a radiant temperature Tr, an air temperature Ta, an air velocity Vair, a relative humidity RH and a saturated water vapor pressure Pa* of the environment, the sensor outputting analog signals corresponding to the respective measurements;

an analog to digital converter for receiving the analog signals output from the sensor and converting the analog signals to respective digital signals;

a first operative temperature calculating means for receiving the digital signals output from the analog to digital converter and for calculating a digital signal value corresponding to an operative temperature $T_0$ of the environment on the basis of the radiant temperature Tr, the air temperature Ta, the air velocity Vair, eigenvalue coefficients $b_1$ and $b_2$, and a coefficient n representing an index value of the air velocity Vair, according to the following equation:

$$T_0 = \frac{b_1 \cdot Tr + b_2 \cdot Vair^n \cdot Ta}{b_1 + b_2 \cdot Vair^n}$$

where
- $b_1 = 3.9$ (the radiant heat transfer coefficient for a human body (W/m² °K.)),
- $b_2 = A$ (where $hc = A \times Vair^{0.5}$ is the convection heat transfer coefficient for human body (W/m² °K.)), and
- the coefficient n ranges in value from 0.36 to 0.6;

a predicted mean thermal sensitivity calculating means for receiving the digital signals output from both the analog to digital converter and the first operative temperature calculating means and calculating a digital signal corresponding to a predicted mean thermal sensitivity PMV* value on the basis of the operative temperature $T_0$, the air temperature Ta, the relative humidity RH, the saturated water vapor pressure Pa*, a clothing thermal resistance Icl, a variable $h_0$ ($h_0 = b_1 + b_2 \cdot Vair^n$), and eigenvalue coefficients $a_1$ to $a_6$ according to the following equation:

$$PMV^* = a_1 + a_2 \cdot Ta + a_3 \cdot RH \cdot Pa^* - \frac{a_4 \cdot h_0}{1 + a_5 \cdot Icl \cdot h_0} \cdot (a_6 - T_0)$$

where
- $a_1 = a \times [10.28 + 49.52 \times Met \times 58.15 - 0.781 \times Tsk - 0.42 \times (Met-1) \times 58.15]$ $a_2 = a \times 0.0814 \times \text{Met}$ $a_3 = a \times (0.4067 + 0.1333 \times \text{Met}) \times 10^{-2}$ $a_4 = a \times \text{fcl}$ $a_5 = 0.155 \times \text{fcl}$ $a_6 = \text{Tsk}$ $a = 0.303 \times \text{EXP}(-0.036 \times \text{Met} \times 58.15) + 0.028$ $\text{Tsk} = 35.7 - 0.028 \times \text{Met} \times 58.15 \ (°\text{C})$ $$Pa^* = \text{EXP}\left(18.6686 - \frac{4030.183}{Ta + 235}\right) (\text{mmHg})$$

Met = Metabolism (met)
fcl = Coefficient (N.D.)
Ta = Air temperature (°C.)
Pa* = Saturated vapor pressure (mmHg); and a digital to analog converter for receiving the predicted mean thermal sensitivity PMV* digital signal value output from the predicted mean thermal sensitivity calculating means and converting the predicted mean thermal sensitivity PMV* digital signal value into a predicted mean thermal sensitivity PMV* analog signal value; and the air conditioning and/or heating unit receiving the predicted mean thermal sensitivity PMV* analog signal value and controlling at least the air temperature and air velocity of supply air output to the environment from the air conditioning and/or heating unit in accordance with the magnitude of the electrical control signal to regulate the degree of comfort in the environment.

4. An apparatus according to claim 3, further comprising an environment measuring unit for obtaining a measured operative temperature $T_0^*$ having an eigenvalue coefficient $b_3$, and being represented by the following equation:

$$T_0^* = \frac{b_1 \cdot Tr + b_3 \cdot Vair^n \cdot Ta}{b_1 + b_3 \cdot Vair^n}$$

wherein the operative temperature calculating means calculates the operative temperature $T_0$ by the following three equations:

$T_1 = T_0^* \times (b_1 \times b_3 \cdot Vair^n)$ $T_2 = T_1 + (b_2 - b_3) \cdot Vair^n \cdot Ta$ $T_0 = T_2 / (b_1 + b_2 \cdot Vair^n)$ and wherein $b_3 = A(\text{sens})$ (where $Hc(\text{sens}) = A(\text{sens}) \times (Vair^n)$ is the convection heat transfer coefficient for a sensor body (W/m² °K.)).

5. A method of controlling an air conditioning and/or heating unit for regulating the degree of comfort in an environment in accordance with a predicted mean thermal sensitivity PMV* value, comprising the steps of:

measuring a radiant temperature Tr, an air temperature Ta, an air velocity Vair, a relative humidity RH and a saturated water vapor pressure Pa*;

calculating an operative temperature $T_0$ on the basis of the radiant temperature Tr, the air temperature Ta, the air velocity Vair, eigenvalue coefficients $b_1$ and $b_2$, and a coefficient n representing an index value of the air velocity Vair, according to the following equation:

$$T_0 = \frac{b_1 \cdot Tr + b_2 \cdot Vair^n \cdot Ta}{b_1 + b_2 \cdot Vair^n}$$

where $b_1 = 3.9$ (the radiant heat transfer coefficient for a human body (W/m² °K.)), $b_2 = A$ (where $hc = A \times Vair^{0.5}$ is the convection heat transfer coefficient for human body (W/m² °K.)), and the coefficient n ranges in value from 0.36 to 0.6;

calculating the predicted mean thermal sensitivity PMV* value on the basis of the operative temperature $T_0$, the air temperature Ta, the relative humidity RH, the saturated water vapor pressure Pa*, a clothing thermal resistance Icl, a variable $h_0$ ($h_0 = b_1 + b_2 \cdot Vair^n$), and eigenvalue coefficients $a_1$ to $a_6$ according to the following equation:

$PMV^* =$ $$a_1 + a_2 \cdot Ta + a_3 \cdot RH \cdot Pa^* - \frac{a_4 \cdot h_0}{1 + a_5 \cdot Icl \cdot h_0} \cdot (a_6 - T_0)$$

where $a_1 = a \times [10.28 + 49.52 \times \text{Met} \times 58.15 - 0.781 \times \text{Tsk} - 0.42 \times (\text{Met-1}) \times 58.15]$ $a_2 = a \times 0.0814 \times \text{Met}$ $a_3 = a \times (0.4067 + 0.1333 \times \text{Met}) \times 10^{-2}$ $a_4 = a \times \text{fcl}$ $a_5 = 0.155 \times \text{fcl}$ $a_6 = \text{Tsk}$ $a = 0.303 \times \text{EXP}(-0.036 \times \text{Met} \times 58.15) + 0.028$ $\text{Tsk} = 35.7 - 0.028 \times \text{Met} \times 58.15 \ (°\text{C})$ $$Pa^* = \text{EXP}\left(18.6686 - \frac{4030.183}{Ta + 235}\right) (\text{mmHg})$$

Met = Metabolism (met)
fcl = Coefficient (N.D.)
Ta = Air temperature (°C.)
Pa* = Saturated vapor pressure (mmHg);

generating an electrical control signal having a magnitude corresponding to the calculated predicted mean thermal sensitivity PMV* value;

supplying the electrical control signal to a controller of the air conditioning and/or heating unit, the air conditioning and/or heating unit having at least a fan for providing supply air to the environment and a heating element for heating the supply air, with the controller being electrically coupled to the fan and heating element for regulating at least the air velocity and air temperature of the supply air output to the environment; and controlling at least the fan and heating element of the air conditioning and/or heating unit by the controller in accordance with the magnitude of the electrical control signal to regulate the degree of comfort in the environment.

6. A method according to claim 5, further comprising the step of obtaining a measured operative temperature $T_0^*$ through the use of an environment measuring unit, the measured operative temperature $T_0^*$ having an eigenvalue coefficient $b_3$ and being represented by the following equation:

$$T_0^* = \frac{b_1 \cdot Tr + b_3 \cdot Vair^n \cdot Ta}{b_1 + b_3 \cdot Vair^n}$$

wherein the operative temperature $T_0$ is then calculated by the following three equations:

$$T_1 = T_0^* \times (b_1 \times b_3 \cdot Vair^n)$$

$$T_2 = T_1 + (b_2 - b_3) \cdot Vair^n \cdot Ta$$

$$T_0 = T_2 / (b_1 + b_2 \cdot Vair^n)$$

and wherein
  $b_3 = A$ (sens) (where Hc (sens) = A (sens) $\times$ (Vair$^n$) is the convection heat transfer coefficient for a sensor body (W/m$^2$ °K.)).

7. An apparatus for providing adaptable control of an air conditioning and/or heating unit to regulate the degree of comfort in an environment in accordance with a predicted mean thermal sensitivity PMV* value, the air conditioning and/or heating unit having at least a fan for providing supply air to the environment, a heating element for heating the supply air and a controller electrically coupled to the fan and heating element for regulating at least the air velocity and air temperature of supply air output to the environment, the apparatus comprising:
  at least one environment measuring sensor for measuring a radiant temperature Tr, an air temperature Ta, an air velocity Vair, a relative humidity RH and a saturated water vapor pressure Pa* of the environment, the sensor outputting analog signals corresponding to the respective measurements;
  an analog to digital converter for receiving the analog signals output from the sensor and converting the analog signals to respective digital signals;
  a first operative temperature calculating means for receiving the digital signals output from the analog to digital converter and for calculating a digital signal value corresponding to an operative temperature $T_0$ of the environment on the basis of the radiant temperature Tr, the air temperature Ta, the air velocity Vair, eigenvalue coefficients $b_1$ and $b_2$, and a coefficient n representing an index value of the air velocity Vair, according to the following equation:

$$T_0 = \frac{b_1 \cdot Tr + b_2 \cdot Vair^n \cdot Ta}{b_1 + b_2 \cdot Vair^n}$$

where
  $b_1 = 3.9$ (the radiant heat transfer coefficient for a human body (W/m$^2$ °K.)),
  $b_2 = A$ (where hc = A $\times$ Vair$^{0.5}$ is the convection heat transfer coefficient for human body (W/m$^2$ °K.)), and
  the coefficient n ranges in value from 0.36 to 0.6;
  a predicted mean thermal sensitivity calculating means for receiving the digital signals output from both the analog to digital converter and the first operative temperature calculating means and calculating a digital signal corresponding to a predicted mean thermal sensitivity PMV* value on the basis of the operative temperature $T_0$, the air temperature Ta, the relative humidity RH, the saturated water vapor pressure Pa*, a clothing thermal resistance Icl, a variable $h_0$ ($h_0 = b_1 + b_2 \cdot Vair^n$), and eigenvalue coefficients $a_1$ to $a_6$ according to the following equation:

$$PMV^* = a_1 + a_2 \cdot Ta + a_3 \cdot RH \cdot Pa^* - \frac{a_4 \cdot h_0}{1 + a_5 \cdot Icl \cdot h_0} \cdot (a_6 - T_0)$$

where
  $a_1 = a \times [10.28 + 49.52 \times Met \times 58.15 - 0.781 \times Tsk - 0.42 \times (Met-1) \times 58.15]$
  $a_2 = a \times 0.0814 \times Met$
  $a_3 = a \times (0.4067 + 0.1333 \times Met) \times 10^{-2}$
  $a_4 = a \times fcl$
  $a_5 = 0.155 \times fcl$
  $a_6 = Tsk$
  $a = 0.303 \times EXP(-0.036 \times Met \times 58.15) + 0.028$
  $Tsk = 35.7 - 0.028 \times Met \times 58.15$ (°C.)

$$Pa^* = EXP\left(18.6686 - \frac{4030.183}{Ta + 235}\right)(mmHg)$$

Met = Metabolism (met)
fcl = Coefficient (N.D.)
Ta = Air temperature (°C.)
Pa* = Saturated vapor pressure (mmHg); and
  a digital to analog converter for receiving the predicted mean thermal sensitivity PMV* digital signal value output from the predicted mean thermal sensitivity calculating means and converting the predicted mean thermal sensitivity PMV* digital signal value into a predicted mean thermal sensitivity PMV* analog signal value; and
  the controller of the air conditioning and/or heating unit receiving the predicted mean thermal sensitivity PMV* analog signal value and controlling at least the fan and the heating element of the air conditioning and/or heating unit in accordance with the magnitude of the predicted mean thermal sensitivity PMV* analog signal value.

8. An apparatus according to claim 7, further comprising an environment measuring unit for obtaining a measured operative temperature $T_0^*$ having an eigenvalue coefficient $b_3$, and being represented by the following equation:

$$T_0^* = \frac{b_1 \cdot Tr + b_3 \cdot Vair^n \cdot Ta}{b_1 + b_3 \cdot Vair^n}$$

wherein the operative temperature calculating means calculates the operative temperature $T_0$ by the following three equations:

$$T_1 = T_0^* \times (b_1 \times b_3 \cdot Vair^n)$$

$$T_2 = T_1 + (b_2 - b_3) \cdot Vair^n \cdot Ta$$

$$T_0 = T_2 / (b_1 + b_2 \cdot Vair^n)$$

and wherein
  $b_3 = A$(sens) (where Hc(sens) = A(sens) $\times$ (Vair$^n$) is the convection heat transfer coefficient for a sensor body (W/m$^2$ °K.)).

* * * * *